(12) United States Patent
Gonzalez et al.

(10) Patent No.: US 8,784,517 B1
(45) Date of Patent: Jul. 22, 2014

(54) POLYCRYSTALLINE DIAMOND COMPACTS, METHODS OF FABRICATING SAME, AND APPLICATIONS THEREFOR

(75) Inventors: Jair J. Gonzalez, Provo, UT (US);
David P. Miess, Highland, UT (US);
Mark P. Chapman, Provo, UT (US);
Steven L. Choate, Spanish Fork, UT (US); D. Bart Crockett, Mapleton, UT (US); Jeffery A. Gerber, Springville, UT (US)

(73) Assignee: US Synthetic Corporation, Orem, UT (US)

( * ) Notice: Subject to any disclaimer, the term of this patent is extended or adjusted under 35 U.S.C. 154(b) by 762 days.

(21) Appl. No.: 12/717,158

(22) Filed: Mar. 4, 2010

Related U.S. Application Data (60) Provisional application No. 61/157,611, filed on Mar. 5, 2009.

(51) Int. Cl.
*B24D 3/02* (2006.01)
*C09C 1/68* (2006.01)
*C09K 3/14* (2006.01)
*B24D 3/00* (2006.01)

(52) U.S. Cl.
USPC .............................................. 51/293; 51/307

(58) Field of Classification Search
USPC ................................................... 51/293, 307
See application file for complete search history.

(56) References Cited

U.S. PATENT DOCUMENTS

| | | | |
|---|---|---|---|
| 4,268,276 A | 5/1981 | Bovenkerk | |
| 4,274,900 A | 6/1981 | Mueller et al. | |
| 4,410,054 A | 10/1983 | Nagel et al. | |
| 4,468,138 A | 8/1984 | Nagel | |
| 4,560,014 A | 12/1985 | Geczy | |
| 4,629,373 A | 12/1986 | Hall | |
| 4,664,705 A * | 5/1987 | Horton et al. | 75/243 |
| 4,738,322 A | 4/1988 | Hall et al. | |
| 4,811,801 A | 3/1989 | Salesky et al. | |
| 4,913,247 A | 4/1990 | Jones | |
| 5,016,718 A | 5/1991 | Tandberg | |
| 5,092,687 A | 3/1992 | Hall | |
| 5,120,327 A | 6/1992 | Dennis | |
| 5,135,061 A | 8/1992 | Newton, Jr. | |
| 5,154,245 A | 10/1992 | Waldenstrom et al. | |
| 5,180,022 A | 1/1993 | Brady | |
| 5,364,192 A | 11/1994 | Damm et al. | |
| 5,368,398 A | 11/1994 | Damm et al. | |
| 5,460,233 A | 10/1995 | Meany et al. | |
| 5,480,233 A | 1/1996 | Cunningham | |
| 5,544,713 A | 8/1996 | Dennis | |

(Continued)

OTHER PUBLICATIONS

U.S. Appl. No. 11/545,929, filed Oct. 10, 2006, Bertagnolli et al.
U.S. Appl. No. 12/185,457, filed Aug. 4, 2008, Vail et al.
U.S. Appl. No. 12/558,939, filed Sep. 14, 2009, Miess et al.
U.S. Appl. No. 61/157,611, filed, Mar. 5, 2009, Gonzalez.
U.S. Appl. No. 12/558,939, mailed Jan. 24, 2012, Restriction Requirement.

(Continued)

*Primary Examiner* — Shuangyi Abu Ali
(74) *Attorney, Agent, or Firm* — Dorsey & Whitney LLP (57) ABSTRACT

Embodiments of the invention relate to polycrystalline diamond compacts ("PDCs") including a pre-sintered polycrystalline diamond ("PCD") table that may exhibit a non-cylindrical-shaped geometry and/or may have been partially graphitized prior to bonding to a substrate in a high-pressure/high-temperature process ("HPHT"). The disclosed PDCs may be used in a variety of applications, such as rotary drill bits, mining tools, drill bits, bearing apparatuses, wire-drawing dies, machining equipment, and other articles and apparatuses.

13 Claims, 8 Drawing Sheets

(56) References Cited

U.S. PATENT DOCUMENTS

| | | | |
|---|---|---|---|
| 5,725,413 A | 3/1998 | Malshe et al. | |
| 6,521,174 B1 | 2/2003 | Butcher et al. | |
| 6,562,462 B2* | 5/2003 | Griffin et al. | 428/408 |
| 6,793,681 B1 | 9/2004 | Pope et al. | |
| 7,493,973 B2* | 2/2009 | Keshavan et al. | 175/434 |
| 2008/0023230 A1 | 1/2008 | Cho | |
| 2009/0173015 A1* | 7/2009 | Keshavan et al. | 51/307 |

OTHER PUBLICATIONS

U.S. Appl. No. 12/558,939 mailed Jul. 5, 2012, Office Action.
U.S. Appl. No. 12/558,939 mailed May 7, 2013, Final Office Action.
U.S. Appl. No. 12/558,939, mailed Oct. 22, 2012, Office Action.
U.S. Appl. No. 12/558,939, mailed Aug. 21, 2013, Advisory Action.

* cited by examiner

POLYCRYSTALLINE DIAMOND COMPACTS, METHODS OF FABRICATING SAME, AND APPLICATIONS THEREFOR

CROSS-REFERENCE TO RELATED APPLICATION

This application claims the benefit of U.S. Provisional Application No. 61/157,611 filed on Mar. 5, 2009, the disclosure of which is incorporated herein, in its entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container or cartridge with a volume of diamond particles positioned on a surface of the cemented carbide substrate. A number of such cartridges may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of a matrix of bonded diamond grains having diamond-to-diamond bonding therebetween, with interstitial regions between the bonded diamond grains being occupied by the solvent catalyst.

Despite the availability of a number of different PDCs, manufacturers and users of PDCs continue to seek PDCs that exhibit improved toughness, wear resistance, and/or thermal stability.

SUMMARY

Embodiments of the invention relate to PDCs including a pre-sintered PCD table that may exhibit a non-cylindrical-shaped geometry and/or may have been partially graphitized prior to bonding to a substrate in an HPHT process. In an embodiment, a PDC includes a substrate and a non-cylindrical-shaped pre-sintered PCD table bonded to the substrate. The non-cylindrical-shaped pre-sintered PCD table includes a plurality of bonded diamond grains defining a plurality of interstitial regions, an upper surface, and a back surface that is bonded to the substrate.

In an embodiment, a method of fabricating a PDC includes providing an at least partially leached PCD table including a plurality of interstitial regions therein. The method further includes partially graphitizing the at least partially leached PCD table to form a partially graphitized PCD table. The method also includes positioning the partially graphitized PCD table adjacent to a substrate. The method further includes infiltrating the partially graphitized PCD table with a metallic infiltrant from the substrate.

Other embodiments include applications utilizing the disclosed PDCs in various articles and apparatuses, such as rotary drill bits, machining equipment, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PDCs including a pre-sintered PCD table that may exhibit a non-cylindrical-shaped geometry and/or may have been partially graphitized prior to bonding to a substrate in an HPHT process. The disclosed PDCs may be used in a variety of applications, such as rotary drill bits, mining tools, drill bits, bearing apparatuses, wire-drawing dies, machining equipment, and other articles and apparatuses.

Figure 1A:
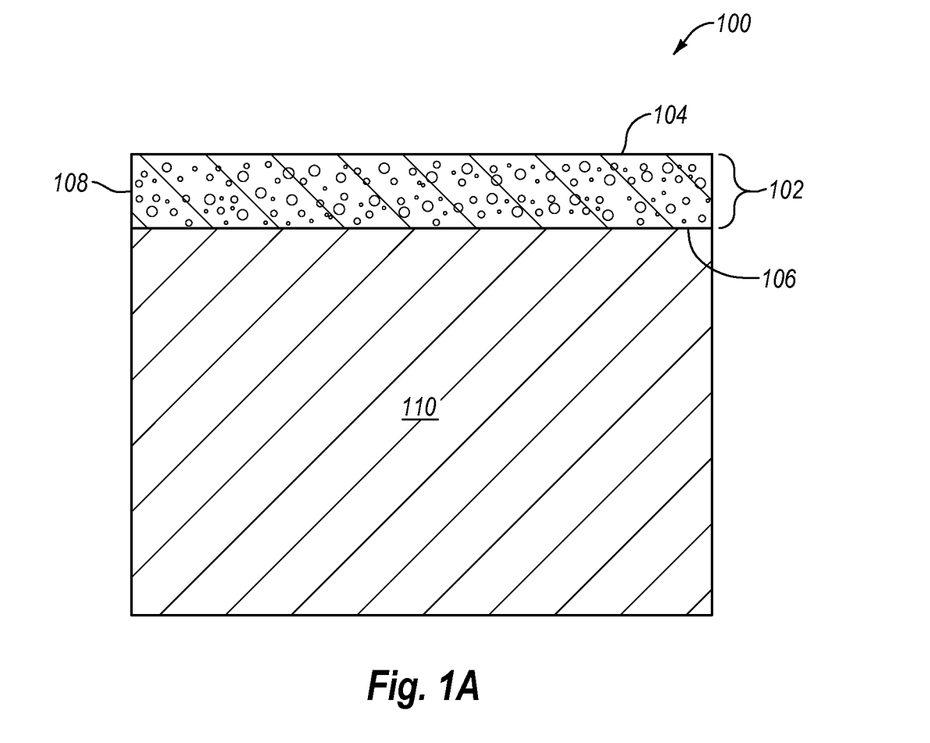
FIG. 1A is a cross-sectional view of an assembly to be HPHT processed to form a PDC according to an embodiment of a method.

FIG. 1A is a cross-sectional view of an assembly 100 to be HPHT processed to form a PDC according to an embodiment of a method. The assembly 100 includes an at least partially leached PCD table 102 that exhibits a non-cylindrical-shaped geometry. The at least partially leached PCD table 102 includes a working, upper surface 104, a back surface 106, and at least one lateral periphery 108. The at least partially leached PCD table 102 includes a plurality of directly bonded-together diamond grains exhibiting diamond-to-diamond bonding therebetween, such as $sp^3$ bonding. The plurality of directly bonded-together diamond grains define a plurality of interstitial regions that were previously occupied by a metal-solvent catalyst and form a network of at least partially interconnected pores that extend between the upper surface 104 and the back surface 106 so that fluid can flow therebetween. Other regions of the at least partially leached PCD table 102 may also function as a working region, such as the at least one lateral periphery 108. The assembly 100 may be formed by positioning the back surface 106 of the at least partially leached PCD table 102 adjacent to a substrate 110.

Suitable materials for the substrate 110 include cemented carbides, such as titanium carbide, niobium carbide, tantalum carbide, vanadium carbide, tungsten carbide, or combinations of any of the preceding carbides cemented with iron, nickel, cobalt, or alloys thereof. In an embodiment, the substrate 110 may comprise cobalt-cemented tungsten carbide. Although the interfacial surface of the substrate 110 is illustrated as being substantially planar, the interfacial surface may exhibit a selected nonplanar geometry and the back surface 106 of the at least partially leached PCD table 102 may exhibit a correspondingly configured geometry.

Figure 1B:
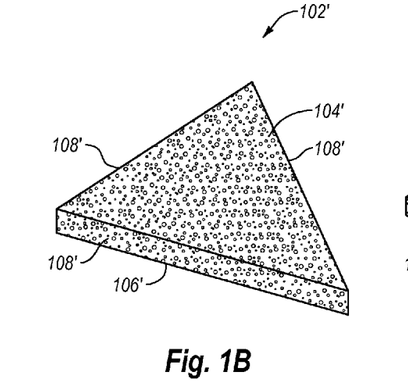
FIGS. 1B-1F are isometric views of embodiments of different non-cylindrical-shaped geometries that the at least partially leached PCD table shown in FIG. 1A may exhibit.
Figure 1C:
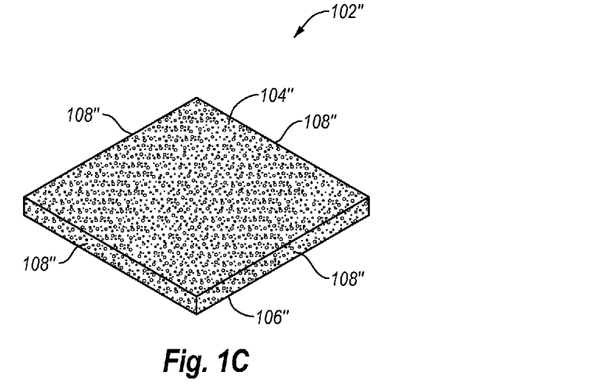
Figure 1D:
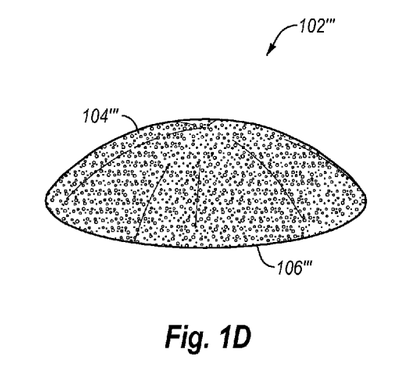
Figure 1E:
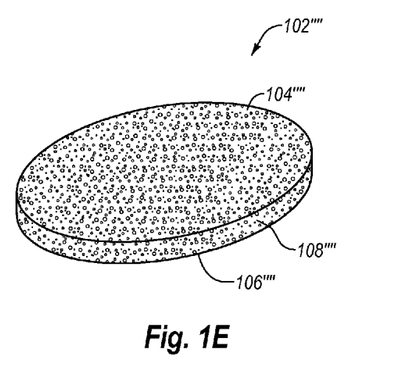
Figure 1F:
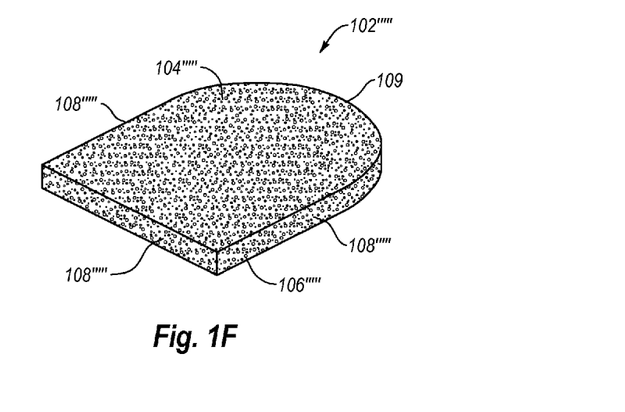

The at least partially leached PCD table 102 may exhibit any number of different non-cylindrical-shaped geometries. FIG. 1B is an isometric view of an embodiment for an at least partially leached PCD table 102' that exhibits a triangular-shaped geometry, and includes an upper substantially planar surface 104', a back surface 106', and a three lateral peripheral surfaces 108'. FIG. 1C is an isometric view of an embodiment for an at least partially leached PCD table 102" that exhibits a rectangular-shaped geometry, and includes an upper substantially planar surface 104", a back surface 106", and a four substantially planar lateral peripheral surfaces 108". In some embodiments, the four substantially planar lateral peripheral surfaces 108" may be approximately equal in length to define the periphery of a square. In other embodiments, a first pair of opposing substantially planar lateral peripheral surfaces 108" may be approximately equal in length and a second pair of opposing substantially planar lateral surfaces 108" may be approximately equal in length but different in length from the first pair. FIG. 1D is an isometric view of an embodiment of a non-cylindrical-shaped geometry for an at least partially leached PCD table 102''' that exhibits a semi-hemispherical geometry, and includes a convex upper surface 104''' and a back surface 106'''. FIG. 1E is an isometric view of an embodiment of a non-cylindrical-shaped geometry for an at least partially leached PCD table 102'''' that exhibits a generally oval geometry. The at least partially leached PCD table 102''''- includes an upper substantially planar surface 104'''', a back surface 106''', and a lateral periphery 108'''' extending therebetween. FIG. 1F is an isometric view of an embodiment for a non-cylindrical shaped at least partially leached PCD table 102''''' that may include one or more substantially planar peripheral surfaces 108''''', at least one curved peripheral surface 109, an upper substantially planar surface 104''''', and an opposing back surface 106'''''. It should be noted that the illustrated embodiments for at least partially leached PCD tables shown in FIGS. 1A-1F are merely examples, and other suitably configured non-cylindrical-shaped at least partially leached PCD table may be employed.

The assembly 100 may be placed in a pressure transmitting medium, such as a refractory metal can embedded in pyrophyllite or other pressure transmitting medium. For example, various embodiments for sealing the assembly 100 in a can assembly (e.g., a brazed can assembly) are disclosed in U.S. patent application Ser. No. 11/545,929, the disclosure of which is incorporated herein, in its entirety, by this reference. The pressure transmitting medium, including the assembly 100, may be subjected to an HPHT process using an ultra-high pressure press to create temperature and pressure conditions at which diamond is stable. The temperature of the HPHT process may be at least about 1000° C. (e.g., about 1200° C. to about 1600° C.) and the pressure of the HPHT process may be at least 4.0 GPa (e.g., about 5.0 GPa to about 12.0 GPa, about 5.0 GPa to about 8.0 GPa) for a time sufficient to liquefy a metallic infiltrant present in the substrate 110 and infiltrate the interstitial regions of the at least partially leached PCD table 102 (represented as infiltrated PCD table 112 shown in FIGS. 1G and 1H and also known as a pre-sintered PCD table). For example, the pressure of the HPHT process may be about 5 GPa to about 7 GPa and the temperature of the HPHT process may be about 1150° C. to about 1400° C. (e.g., about 1200° C. to about 1300° C.). The infiltrated PCD table 112 and substrate 110 are illustrated as being generally oval in FIG. 1G, but the infiltrated PCD table 112 and substrate 110 may exhibit any suitable non-cylindrical geometry, as previously described hereinabove.

The metallic infiltrant in the substrate 110 may be a cementing constituent (e.g., cobalt, iron, nickel, or alloys thereof) that cements a plurality of carbide particles together (e.g., titanium carbide, niobium carbide, tantalum carbide, vanadium carbide, tungsten carbide, or combinations of any of the preceding carbides). For example, in an embodiment, the metallic infiltrant may be cobalt from a cobalt-cemented tungsten carbide substrate.

The temperature of the HPHT process is sufficient to cause the metallic infiltrant present in the substrate 110 (e.g., cobalt in a cobalt-cemented tungsten carbide substrate) to infiltrate into the interstitial regions of the at least partially leached PCD table 102 (FIG. 1A). Upon cooling from the HPHT process, a strong metallurgical bond between the infiltrated PCD table 112 and the substrate 110 is formed due to the infiltration of the metallic infiltrant.

As an alternative to or in addition to infiltrating the at least partially leached PCD table 102 with a metallic infiltrant from the substrate 110, a layer of metallic infiltrant may be disposed between the at least partially leached PCD table 102 and the substrate 110. The layer may comprise cobalt, iron, nickel, copper, Group 13 metals of the Periodic Table (e.g., aluminum or gallium), Group 14 metals of the Periodic Table (e.g., germanium), Group 15 metals of the Periodic Table (e.g., antimony or bismuth), or alloys of any of the foregoing. In some embodiments, the metallic infiltrant is provided substantially entirely from the layer. In other embodiments, the metallic infiltrant is provided from the layer and from the substrate 110.

In an embodiment, the infiltrated PCD table 112 may be subjected to one or more mechanical finishing operations after bonding to the substrate 110. The mechanical finishing operations may include grinding, lapping, or combinations of foregoing. For example, the finishing operations may be used to lap and substantially planarize the upper surface 104 and form a peripherally-extending chamfer in the infiltrated PCD table 112 that extends between the periphery 112 and the upper surface 104 before or after the lapping.

The infiltrated PCD table 112 may exhibit a greater wear resistance and/or thermal stability than the at least partially leached PCD table 102 and a PCD table integrally formed on a substrate from diamond powder. It is currently believed by the inventors that this improved wear resistance and/or thermal stability is due, at least in part, to enhanced diamond growth, properties of the metallic infiltrant, a higher diamond density, or combinations of the foregoing.

Figure 1G:
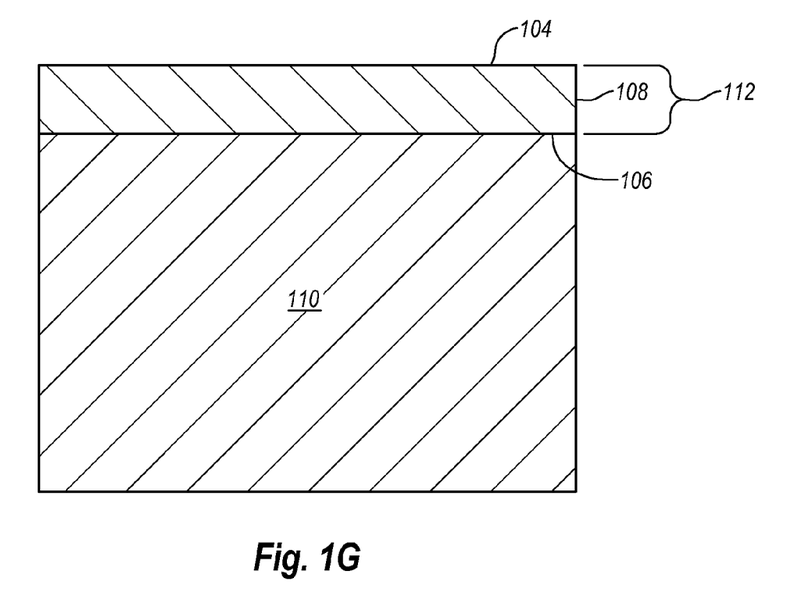
FIG. 1G is cross-sectional view of an embodiment of a PDC formed by HPHT processing the assembly shown in FIG. 1A.
Figure 1H:
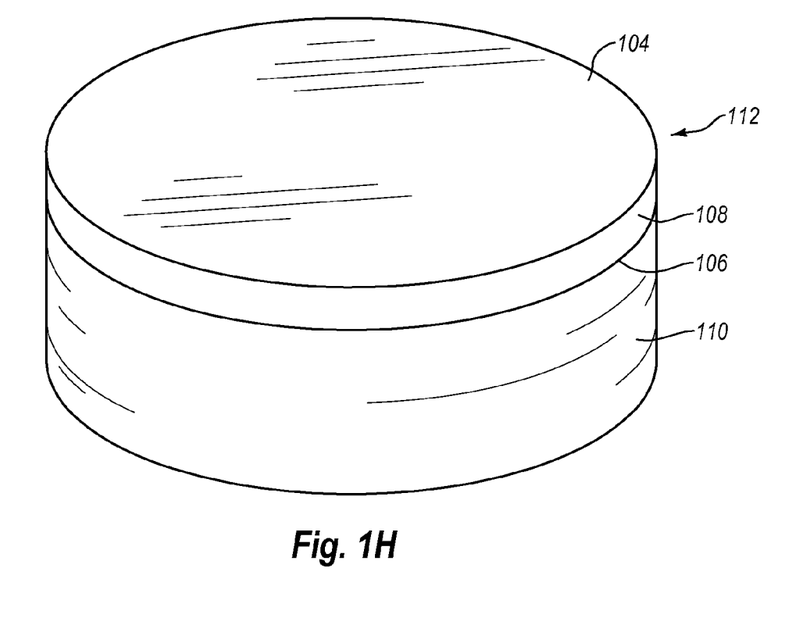
FIG. 1H is an isometric of the PDC shown in FIG. 1A.
Figure 1I:
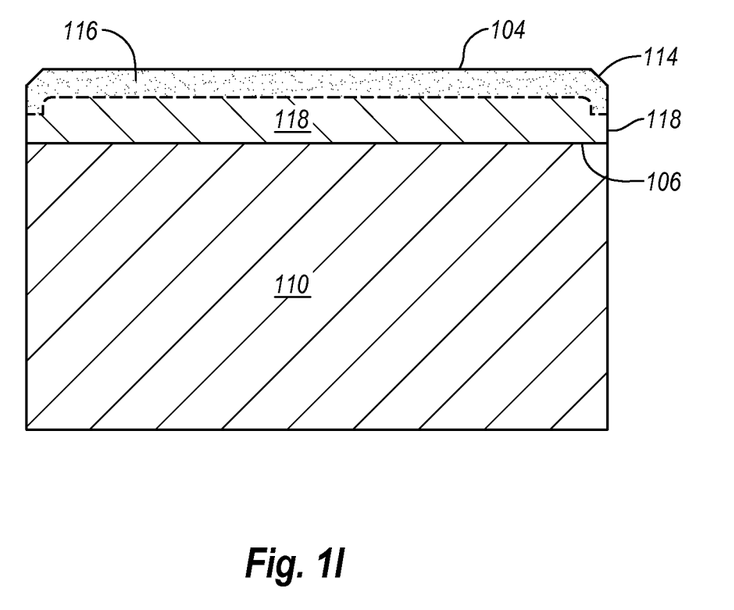
FIG. 1I is cross-sectional view of the PDC shown in FIGS. 1G and 1H after leaching the infiltrated PCD table in accordance with one or more embodiments.

Referring to FIG. 1I, in some embodiments, after forming the PDC shown in FIGS. 1G and 1H, the infiltrated PCD table 112 may be subjected to a lapping process to planarize the upper surface 104 and/or a grinding process to form a chamfer 114 that extends between the lateral periphery 108 and the upper surface 104. After grinding and/or chamfering, the infiltrated PCD table 112 may be leached in a suitable acid (e.g., hydrochloric acid, nitric acid, hydrofluoric acid, aqua regia, or combinations of the foregoing) to deplete the metallic infiltrant from a selected region that extends inwardly from the upper surface 104, the chamfer 114, and at least a portion of the lateral periphery 108 to a selected depth, respectively. The selected region is labeled as leached region 116, and the underlying unaffected region is shown as region 118. For example, the selected depth of the leached region 116 may be about 10 μm to about 500 μm, such as about 50 μm to about 100 μm or about 200 μm to about 350 μm.

The at least partially leached PCD table 102 may be fabricated by subjecting a plurality of diamond particles to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. For example, the diamond particles to be sintered and the metal-solvent catalyst particles, the metal-solvent catalyst foil or powder, and/or the cemented carbide substrate may be sealed in a can assembly as disclosed in U.S. patent application Ser. No. 11/545,929. The bonded diamond grains, so-formed by HPHT sintering the diamond particles, define interstitial regions with the metal-solvent catalyst disposed within the interstitial regions. The diamond particles may exhibit a single-mode diamond particle size distribution, or a bimodal or greater diamond particle size distribution.

The as-sintered PCD body may be leached by immersion in an acid, such as aqua regia, nitric acid, hydrofluoric acid, or subjected to another suitable process to remove at least a portion of the metal-solvent catalyst from the interstitial regions of the PCD body and form the at least partially leached PCD table 102. For example, the as-sintered PCD body may be immersed in the acid for about 2 to about 7 days (e.g., about 3, 5, or 7 days) or for a few weeks (e.g., about 4 weeks) depending on the process employed. Even after leaching, a residual, detectable amount of the metal-solvent catalyst may be present in the at least partially leached PCD table 102. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may be at least partially removed by the selected leaching process or may be relatively unaffected by the selected leaching process.

The at least partially leached PCD table 102 may be subjected to a maching process prior to bonding to the substrate 108, such as grinding, chamfering, lapping, or combinations of the foregoing to tailor the geometry thereof, as desired, for a particular application. The as-sintered PCD body may also be shaped prior to leaching and bonding to the substrate 108 by a machining process, such as grinding, chamfering, lapping, electro-discharge machining, or combinations of the foregoing.

The plurality of diamond particles sintered to form the at least partially leached PCD table 102 may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 μm and 20 μm). More particularly, in various embodiments, the plurality of diamond particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 10 μm, 15 μm, 12 μm, 10 μm, 8 μm, 4 μm, 2 μm, 1 μm, 0.5 μm, less than 0.5 μm, 0.1 μm, less than 0.1 μm). In another embodiment, the plurality of diamond particles may include a portion exhibiting a relatively larger size between about 40 μm and about 15 μm and another portion exhibiting a relatively smaller size between about 12 μm and 2 μm. Of course, the plurality of diamond particles may also include three or more different sizes (e.g., one relatively larger size and two or more relatively smaller sizes) without limitation.

In an embodiment, prior to infiltrating and bonding the at least partially leached PCD table 102 to the substrate 110 in the HPHT process, the at least partially leached PCD table 102 may be cleaned to remove leaching by-products generated during the leaching process. Suitable cleaning processes for cleaning the at least partially leached PCD table 102 are disclosed in U.S. patent application Ser. No. 12/120,849, the disclosure of which is incorporated herein, in its entirety, by this reference.

Figure 2A:
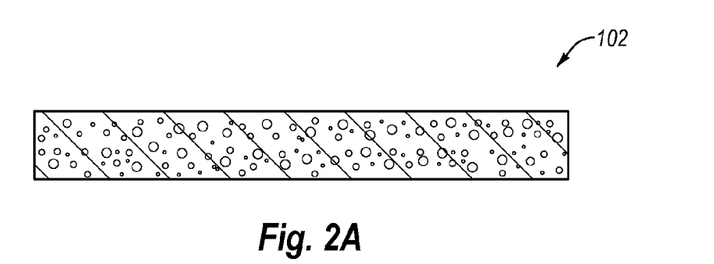
FIGS. 2A-2E are cross-sectional views illustrating various stages in a method of fabricating a PDC according to an embodiment in which an at least partially leached PCD table is partially graphitized prior to being HPHT bonded to a substrate.
Figure 2B:
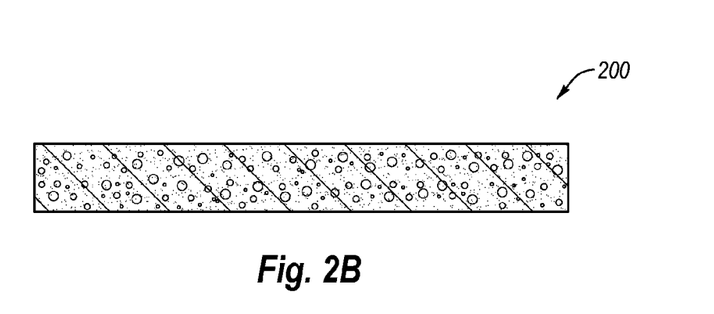

FIGS. 2A-2E are cross-sectional views illustrating various stages in a method of fabricating a PDC according to an embodiment in which an at least partially leached PCD table is partially graphitized prior to being HPHT bonded to a substrate. Referring to FIG. 2A, an at least partially leached PCD table 102 may be provided. The at least partially leached PCD table 102 may be heat-treated under graphite stable pressure/temperature conditions to partially graphitize the diamond grains thereof and form a partially graphitized PCD table 200 (FIG. 2B). For example, the at least partially leached PCD table 102 may be exposed to a temperature of about 750° C. to about 1300° C. (e.g., about 1000° C.) and a pressure below about 1 GPa (e.g., about 100 kPa to about 200 kPa). The heat-treatment may be effective to graphitize about 5 volume percent or less of the at least partially leached PCD table 102, such as about 1 to about 5 volume percent of the at least partially leached PCD table 102, about 2 to about 4 volume percent of the at least partially leached PCD table 102, about 1.5 volume percent to about 3.5 volume percent of the at least partially leached PCD table 102, or about 0.5 volume percent to about 1.5 volume percent of the at least partially leached PCD table 102.

The at least partially leached PCD table 102 may exhibit any of the non-cylindrical geometries discussed hereinabove or another suitable non-cylindrical geometry. Furthermore, in some embodiments, a cylindrically-shaped at least partially leached PCD table may be employed.

Figure 2C:
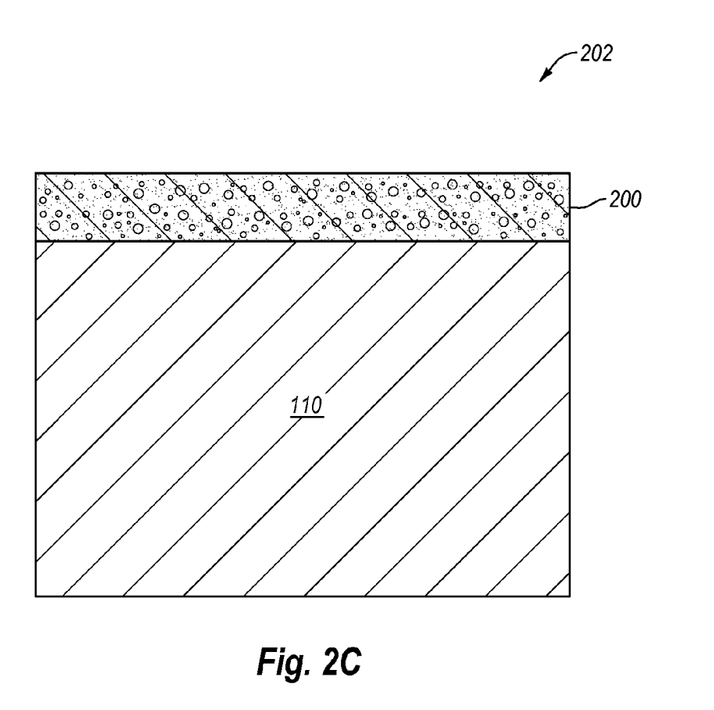

Referring to FIG. 2C, the partially graphitized PCD table 200 may be positioned adjacent to a substrate 110 to form an assembly 202. The assembly 202 may be placed in a pressure transmitting medium, such as a refractory metal can embedded in pyrophyllite or other pressure transmitting medium. For example, the assembly 202 may be sealed in a can assembly (e.g., a brazed can assembly) as disclosed in U.S. patent application Ser. No. 11/545,929. The pressure transmitting medium, including the assembly 202, may be subjected to the same or similar HPHT process conditions used to HPHT process the assembly 100 shown in FIG. 1A.

Figure 2D:
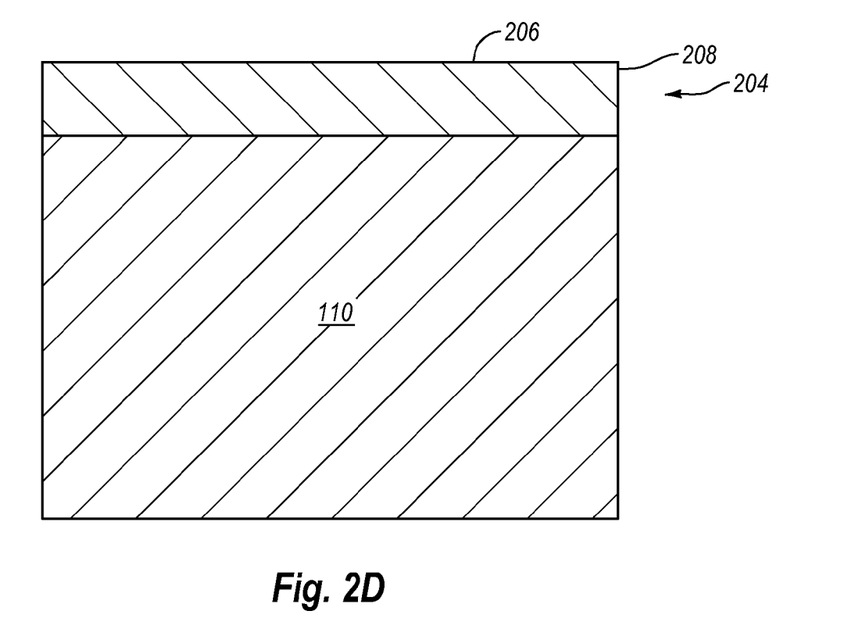

The temperature of the HPHT process is sufficient to cause the metallic infiltrant present in the substrate 110 (e.g., cobalt in a cobalt-cemented tungsten carbide substrate) to infiltrate into the interstitial regions of the partially graphitized PCD table 200 (represented in FIG. 2D as infiltrated PCD table 204 having an upper surface 206 and a lateral periphery 208 and also known as a pre-sintered PCD table). Upon cooling from the HPHT process, a strong metallurgical bond between the infiltrated PCD table 204 and the substrate 110 is formed due to the infiltration of the metallic infiltrant. In some embodiments, a residual amount of graphite may be present in the infiltrated PCD table 204 that was not converted to diamond during the HPHT process.

The metallic infiltrant in the substrate 110 may be a cementing constituent (e.g., cobalt, iron, nickel, or alloys thereof) that cements a plurality of carbide particles together (e.g., titanium carbide, niobium carbide, tantalum carbide, vanadium carbide, tungsten carbide, or combinations of any of the preceding carbides). For example, in an embodiment, the metallic infiltrant may be cobalt from a cobalt-cemented tungsten carbide substrate.

The presence of the graphite in the partially graphitized PCD table 200 is currently believed by the inventors to enhance the diamond structure in the infiltrated PCD table 204 during the HPHT process and/or performance of infiltrated PCD table 204 during use. It is currently believed by the inventor that the graphite may preferentially dissolve in the infiltrated metallic infiltrant and/or may enhance the diamond structure between existing diamond grains during the HPHT process. Accordingly, the wear resistance and/or thermal stability of the infiltrated PCD table 204, for certain applications, may be greater than that of the at least partially leached PCD table 102 and a PCD table integrally formed with a substrate from diamond powder.

As an alternative to or in addition to infiltrating the partially graphitized PCD table 200 with a metallic infiltrant from the substrate 110, a layer of metallic infiltrant may be disposed between the partially graphitized PCD table 200 and the substrate 110. The layer may comprise cobalt, iron, nickel, or alloys thereof. In some embodiments, the metallic infiltrant is provided substantially entirely from the layer. In other embodiments, the metallic infiltrant is provided from the layer and from the substrate 110.

Figure 2E:
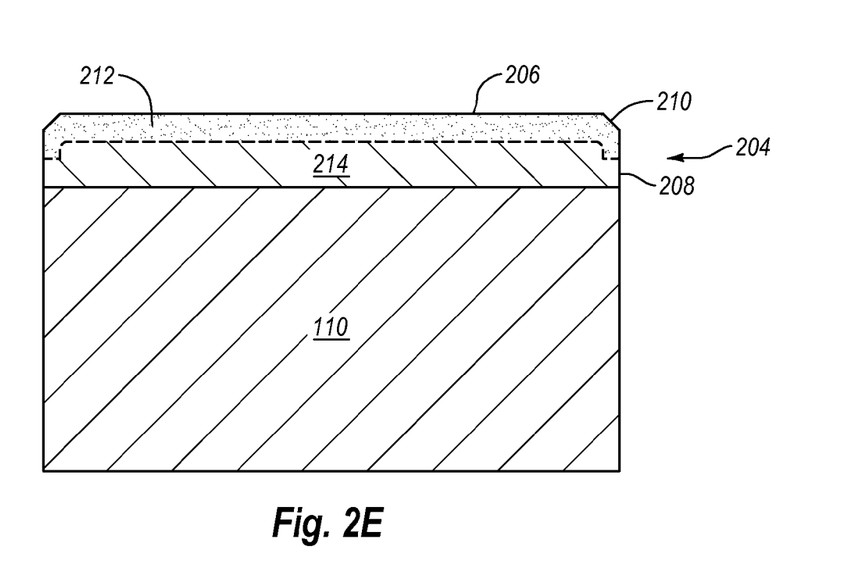

Referring to FIG. 2E, in some embodiments, after forming the PDC shown in FIG. 2D, the infiltrated PCD table 204 may be subjected to a lapping process to planarize the upper surface 206 and/or a grinding process to form a chamfer 210 that extends between the lateral periphery 208 and the upper surface 206. After grinding and/or chamfering, the infiltrated PCD table 204 may be leached in a suitable acid (e.g., hydrochloric acid, nitric acid, hydrofluoric acid, aqua regia, or combinations of the foregoing) to deplete the metallic infiltrant from a selected region that extends inwardly from the upper surface 206, the chamfer 210, and at least a portion of the lateral periphery 208 to a selected depth, respectively. The selected region is labeled as leached region 212, and the underlying unaffected region is shown as region 214. For example, the selected depth of the leached region 212 may be about 10 μm to about 500 μm, such as about 50 μm to about 100 μm or about 200 μm to about 350 μm.

Figure 3:
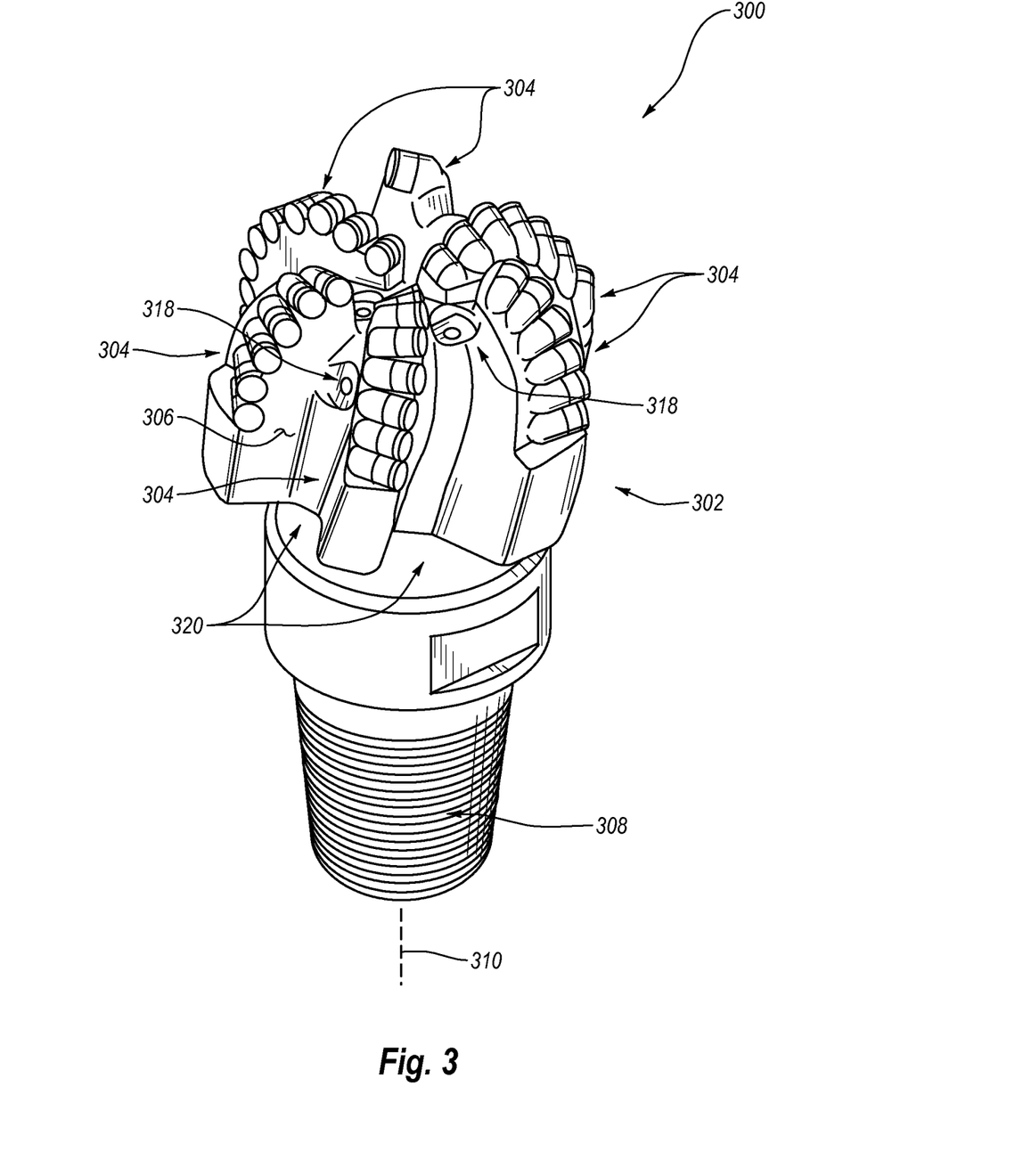
FIG. 3 is an isometric view of an embodiment of a rotary drill bit that may employ one or more of the disclosed PDC embodiments.
Figure 4:
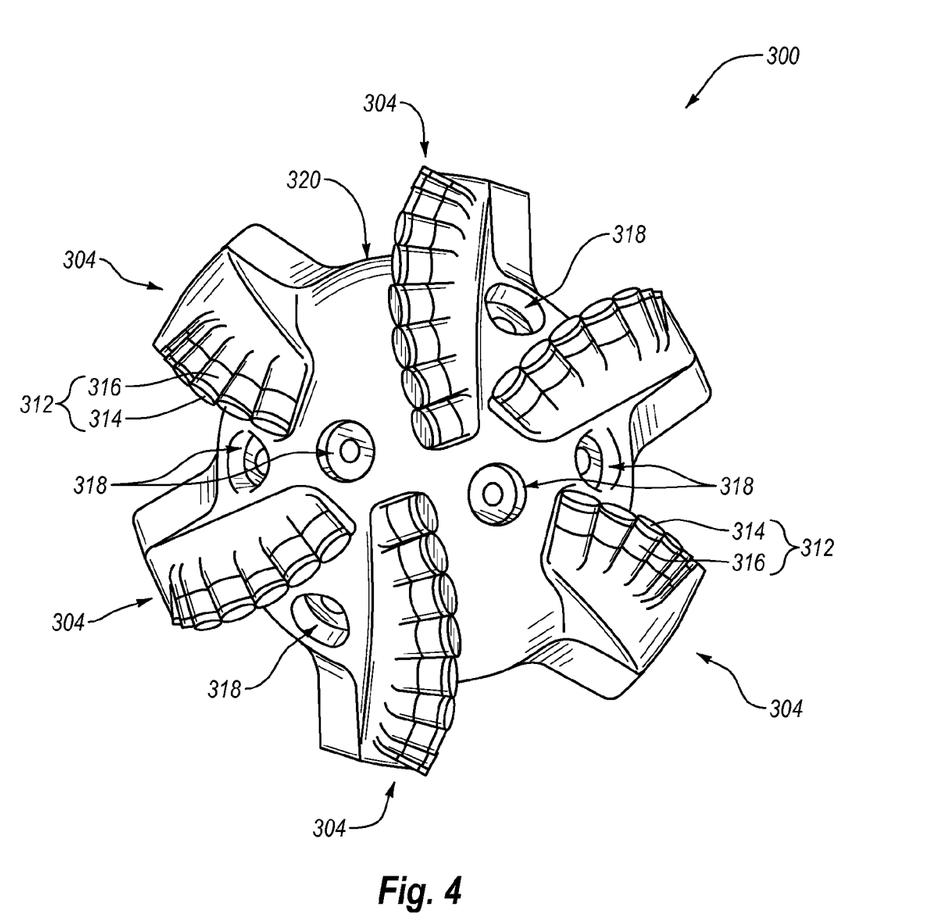
FIG. 4 is a top elevation view of the rotary drill bit shown in FIG. 3.

FIG. 3 is an isometric view and FIG. 4 is a top elevation view of an embodiment of a rotary drill bit 300. The rotary drill bit 300 includes at least one PDC configured according to any of the previously described PDC embodiments, such as the PDC shown in FIG. 1G or 2D. The rotary drill bit 300 comprises a bit body 302 that includes radially and longitudinally extending blades 304 having leading faces 306, and a threaded pin connection 308 for connecting the bit body 302 to a drilling string. The bit body 302 defines a leading end structure for drilling into a subterranean formation by rotation about a longitudinal axis 310 and application of weight-on-bit. At least one PDC, configured according to any of the previously described PDC embodiments, may be affixed to the bit body 302. With reference to FIG. 4, each of a plurality of PDCs 312 is secured to the blades 304 of the bit body 302 (FIG. 3). For example, each PDC 312 may include a pre-sintered PCD table 314 bonded to a substrate 316. More generally, the PDCs 312 may comprise any PDC disclosed herein, without limitation. In addition, if desired, in some embodiments, a number of the PDCs 312 may be conventional in construction. Also, circumferentially adjacent blades 304 define so-called junk slots 320 therebetween. Additionally, the rotary drill bit 300 includes a plurality of nozzle cavities 318 for communicating drilling fluid from the interior of the rotary drill bit 300 to the PDCs 312.

FIGS. 3 and 4 merely depict one embodiment of a rotary drill bit that employs at least one PDC fabricated and structured in accordance with the disclosed embodiments, without limitation. The rotary drill bit 300 is used to represent any number of earth-boring tools or drilling tools, including, for example, core bits, roller-cone bits, fixed-cutter bits, eccentric bits, bicenter bits, reamers, reamer wings, or any other downhole tool including superabrasive compacts, without limitation.

The PDCs disclosed herein (e.g., the PDC shown in FIG. 1G or 2D) may also be utilized in applications other than cutting technology. For example, the disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used on any apparatus or structure in which at least one conventional PDC is typically used. In one embodiment, a rotor and a stator, assembled to form a thrust-bearing apparatus, may each include one or more PDCs (e.g., the PDC shown in FIG. 1G or 2D) configured according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing superabrasive compacts disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A method of fabricating a polycrystalline diamond compact, comprising:
    providing an at least partially leached polycrystalline diamond table including a plurality of interstitial regions therein, wherein the at least partially leached polycrystalline diamond table exhibits a non-cylindrical-shaped geometry;
    partially graphitizing the at least partially leached polycrystalline diamond table to form a partially graphitized polycrystalline diamond table;
    positioning the partially graphitized polycrystalline diamond table adjacent to a substrate; and
    subjecting the partially graphitized polycrystalline diamond table and the substrate to a high-pressure/high-temperature process to form the polycrystalline diamond compact.

2. The method of claim 1 wherein subjecting the at least partially leached polycrystalline diamond table and the substrate to a high-pressure/high-temperature process to form the polycrystalline diamond compact comprises infiltrating the at least partially leached polycrystalline diamond table with a metallic infiltrant from the substrate.

3. The method of claim 2, further comprising at least partially removing the metallic infiltrant from the infiltrated polycrystalline diamond table.

4. The method of claim 1 wherein the substrate comprises a cemented carbide substrate.

5. The method of claim 1 wherein partially graphitizing the at least partially polycrystalline diamond table to form a partially graphitized polycrystalline diamond table comprises heat-treating the at least partially leached polycrystalline diamond table under graphite stable conditions.

6. A method of fabricating a polycrystalline diamond compact, comprising:
    providing an at least partially leached polycrystalline diamond table including a plurality of interstitial regions therein;
    partially graphitizing the at least partially leached polycrystalline diamond table to form a partially graphitized polycrystalline diamond table;
    positioning the partially graphitized polycrystalline diamond table adjacent to a substrate; and
    infiltrating the partially graphitized polycrystalline diamond table with a metallic infiltrant.

7. The method of claim 6 wherein the at least partially leached polycrystalline diamond table exhibits a non-cylindrical-shaped geometry.

8. The method of claim 6 wherein the substrate comprises a cemented carbide substrate.

9. The method of claim 6 wherein partially graphitizing the at least partially leached polycrystalline diamond table to form a partially graphitized polycrystalline diamond table comprises heat-treating the at least partially leached polycrystalline diamond table under graphite stable conditions.

10. The method of claim 6 wherein partially graphitizing the at least partially leached polycrystalline diamond table to form a partially graphitized polycrystalline diamond table comprises partially graphitizing about 5 volume percent or less of the at least partially leached polycrystalline diamond table.

11. The method of claim 6 wherein partially graphitizing the at least partially leached polycrystalline diamond table to form a partially graphitized polycrystalline diamond table comprises partially graphitizing about 2 to about 4 volume percent of the at least partially leached polycrystalline diamond table.

12. The method of claim 6 wherein partially graphitizing the at least partially leached polycrystalline diamond table to form a partially graphitized polycrystalline diamond table comprises partially graphitizing about 0.5 to about 1.5 volume percent of the at least partially leached polycrystalline diamond table.

13. The method of claim 6 wherein the substrate comprises the metallic infiltrant.

* * * * *